US009860826B2

(12) United States Patent
Webb et al.

(10) Patent No.: US 9,860,826 B2
(45) Date of Patent: Jan. 2, 2018

(54) INFRASTRUCTURE EQUIPMENT, MOBILE COMMUNICATIONS NETWORK, SYSTEM AND METHOD

(71) Applicant: Sony Corporation, Tokyo (JP)

(72) Inventors: Matthew Webb, London (GB); Hideji Wakabayashi, Reading (GB)

(73) Assignee: SONY CORPORATION, Tokyo (JP)

( * ) Notice: Subject to any disclaimer, the term of this patent is extended or adjusted under 35 U.S.C. 154(b) by 179 days.

(21) Appl. No.: 14/767,849

(22) PCT Filed: Mar. 19, 2014

(86) PCT No.: PCT/GB2014/050864

§ 371 (c)(1),
(2) Date: Aug. 13, 2015

(87) PCT Pub. No.: WO2014/147397

PCT Pub. Date: Sep. 25, 2014

(65) Prior Publication Data

US 2015/0373624 A1 Dec. 24, 2015

(30) Foreign Application Priority Data

Mar. 21, 2013 (GB) .................................. 1305233.7

(51) Int. Cl.
*H04W 48/08* (2009.01)
*H04W 56/00* (2009.01)
*H04J 11/00* (2006.01)

(52) U.S. Cl.
CPC ......... *H04W 48/08* (2013.01); *H04J 11/0069* (2013.01); *H04W 56/001* (2013.01)

(58) Field of Classification Search
CPC . H04W 56/001; H04L 27/2656; H04B 7/2643
See application file for complete search history.

(56) References Cited

U.S. PATENT DOCUMENTS

2007/0183306 A1* 8/2007 Akita .................. H04J 11/0073 370/208
2008/0205375 A1* 8/2008 Onggosanusi ....... H04J 11/0069 370/350

(Continued)

FOREIGN PATENT DOCUMENTS

EP 1 463 216 A2 9/2004
EP 2 051 395 A1 4/2009

(Continued)

OTHER PUBLICATIONS

Konstantinos DIMOU titled "Machine to Machine (M2M) Communications—Part II, Basics & Challenges" (DIMOU hereinafter) was KTH, Seminars in Signals, Sensors & Systems as Ericsson External published Mar. 4, 2013.*

(Continued)

*Primary Examiner* — Andrew Lai
*Assistant Examiner* — Hoyet H Andrews
(74) *Attorney, Agent, or Firm* — Oblon, McClelland, Maier & Neustadt, L.L.P.

(57) ABSTRACT

An infrastructure equipment forming part of a mobile communications network includes a transmitter configured to transmit signals to communications devices via a wireless access interface, a receiver configured to receive signals transmitted from the communications devices via the wireless access interface, and a controller. The controller controls the transmitter and receiver across a first frequency bandwidth divided in time into plural frames, to form one of plural cells of the mobile communications network, each cell allocated a cell identifier by the mobile communications network. The controller and transmitter transmit in one or more of the frames a synchronization sequence providing an indication of one of the cell identifiers. A relative temporal location of the synchronization sequence within the frame provides the communications devices with an indication of (Continued)

LTE DOWNLINK SUB-FRAME
340
12 sub-carriers
PDSCH
CONTROL REGION
UE4
341
UE3
310
$R_{310}$
SSS PSS PBCH
344
$R_{320}$
SYSTEM INFO
$R_{344}$
UE2
343
UE1
342
SUB-CARRIERS
1 2 3 4 5 6 7 8 9 10 11 12 13 14
300
SYMBOLS the cell identifier which can be combined with detecting the synchronization sequence to improve estimate of the cell identifier for the cell.

20 Claims, 10 Drawing Sheets

(56) References Cited

U.S. PATENT DOCUMENTS

| | | | | |
|---|---|---|---|---|
| 2009/0116374 | A1 * | 5/2009 | Henriksson | H04L 27/2656 370/203 |
| 2009/0129298 | A1 * | 5/2009 | Luo | H04W 56/001 370/280 |
| 2010/0080330 | A1 * | 4/2010 | Kawauchi | H04L 25/0232 375/348 |
| 2011/0002430 | A1 | 1/2011 | Kim et al. | |
| 2011/0044159 | A1 * | 2/2011 | Kishiyama | H04J 11/0069 370/208 |
| 2011/0310878 | A1 * | 12/2011 | Lindoff | H04J 11/005 370/343 |
| 2013/0201884 | A1 * | 8/2013 | Freda | H04W 72/005 370/278 |
| 2013/0203419 | A1 * | 8/2013 | Siomina | H04W 36/18 455/437 |
| 2013/0229953 | A1 | 9/2013 | Nam et al. | |
| 2014/0010183 | A1 | 1/2014 | McNamara et al. | |
| 2014/0018087 | A1 | 1/2014 | McNamara et al. | |
| 2014/0036878 | A1 | 2/2014 | McNamara et al. | |
| 2014/0112285 | A1 | 4/2014 | Darwood et al. | |

FOREIGN PATENT DOCUMENTS

| | | | | |
|---|---|---|---|---|
| WO | WO 2008/042507 | A2 | 4/2008 | |
| WO | WO 2008/042507 | A3 | 4/2008 | |
| WO | WO 2008/042865 | A2 | 4/2008 | |
| WO | WO 2008042865 | A2 * | 4/2008 | H04B 1/7083 |
| WO | WO 2008/083886 | A1 | 7/2008 | |
| WO | WO 2009/049167 | A2 | 4/2009 | |
| WO | WO 2009/049167 | A3 | 4/2009 | |
| WO | WO 2012/104634 | A1 | 8/2012 | |
| WO | WO 2012/104635 | A1 | 8/2012 | |
| WO | WO 2012/104644 | A1 | 8/2012 | |
| WO | WO 2012/121660 | A1 | 9/2012 | |
| WO | WO 2012/172323 | A1 | 12/2012 | |
| WO | WO 2013/025069 | A1 | 2/2013 | |

OTHER PUBLICATIONS

R1-124888, was presented at 3GPP TSG-RAN WG1 Meeting #71, New Orleans, USA, Nov. 12-16, 2012 as Agenda Item: 6.3.3; titled, “Required functionality for coverage enhancements for MTC”.*

R1-130218, was presented at 3GPP TSG-RAN WG1 Meeting #72, St Julian’s, Malta, Jan. 28-Feb. 1, 2013 as Agenda Item: 7.3.4; titled, “On Required System Functionalities for MTC UEs Operating in Enhanced Coverage Mode”.*

Konstantinos DIMOU titled “Machine to Machine (M2M) Communications—Part 1&2, Basics & Challenges” was KTH, Seminars in Signals, Sensors & Systems as Ericsson External published Mar. 4, 2013.*

R1-130219, was presented at 3GPP TSG-RAN WG1 Meeting #72, St Julian’s, Malta, Jan. 28-Feb. 1, 2013 as Agenda Item: 7.3.4; titled, “Coverage Results and Analysis of PSS/SSS for MTC UEs”.*

R1-130549, was presented at 3GPP TSG-RAN WG1 Meeting #72, St Julian’s, Malta, Jan. 28-Feb. 1, 2013 as Agenda Item: 7.3.1.3; titled, “Design for Synchronized and Unsynchronized New Carriers”.*

R1-125120, was presented at 3GPP TSG-RAN WG1 #71, New Orleans, USA, Nov. 12-16, 2012 as Agenda Item: 6.3.3; titled, “Coverage enhancement techniques for MTC”.*

U.S. Appl. No. 14/766,910, filed Aug. 10, 2015, Matthew Webb et al.

International Search Report dated Jul. 3, 2014, in PCT/GB2014/050864 filed Mar. 19, 2014.

Great Britain Search Report dated Sep. 6, 2013, in Great Britain Application No. 1305233.7, filed Mar. 21, 2013.

“SFN Synchronization without BCH bits for LTE”, Sharp, 3GPP TSG RAN WG1 Meeting #49, R1-072050, May 7-11, 2007, 12 pages.

H. Huawei, “Discussion on Evaluation of TDD DL-UL Re-Configuration Dependent on Traffic Adaption”, 3GPP TSG RAN WG1 Meeting #66, R1-112469, Aug. 22-26, 2011, 8 pages.

“Discussion on time and frequency synchronization for the Additional Carrier type”, NEC Group, TSG-RAN WG1 #68, R1-120247, XP050562802, Feb. 6-10, 2012, 4 pages.

* cited by examiner

INFRASTRUCTURE EQUIPMENT, MOBILE COMMUNICATIONS NETWORK, SYSTEM AND METHOD

CROSS-REFERENCE TO RELATED APPLICATIONS

The present application is based on PCT/GB2014/050864 filed Mar. 19, 2014 and claims priority to British Patent Application 1305233.7, filed in the UK IPO on 21 Mar. 2013, the entire contents of each of which being incorporated herein by reference.

TECHNICAL FIELD OF THE INVENTION

The present invention relates infrastructure equipment for mobile communications networks, mobile communications networks and systems and methods of communicating using mobile communications networks.

BACKGROUND OF THE INVENTION

Mobile communications systems continue to be developed to provide wireless communications services to a greater variety of electronic devices. In more recent years, third and fourth generation mobile telecommunication systems, such as those based on the 3GPP defined UMTS and Long Term Evolution (LTE) architectures have been developed to support more sophisticated communications services to personal computing and communications devices than simple voice and messaging services offered by previous generations of mobile telecommunication systems. For example, with the improved radio interface and enhanced data rates provided by LTE systems, a user may enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

More recently it has been recognised that rather than providing high data rate communications services to certain types of electronics devices, it is also desirable to provide communications services to electronics devices that are simpler and less sophisticated. For example, so-called machine type communication (MTC) applications may be semi-autonomous or autonomous wireless communication devices which may communicate small amounts of data on a relatively infrequent basis. Some examples include so-called smart meters which, for example, are located in a customer's house and periodically transmit information back to a central MTC server data relating to the customer's consumption of a utility such as gas, water, electricity and so on.

As will be appreciated a coverage area provided by a cell of a mobile communications network is typically limited by a distance of a communications device from a base station and a radio environment experienced by the communications device. In a case in which a communications device is disposed in an environment which is remote from a base station or is a more difficult radio reception environment, then any improvements which can be made to a radio communications link between the communications device and a base station of the network forming the cell are desirable. This may be applicable also for examples in which the communications devices is an MTC-type device and provided with a low cost and therefore reduced sensitivity receiver.

SUMMARY OF THE INVENTION

Embodiments of the present invention can provide in one example an infrastructure equipment forming part of a mobile communications network comprising a transmitter configured to transmit signals to communications devices via a wireless access interface, a receiver unit configured to receive signals transmitted from communications devices via the wireless access interface, and a controller. The controller is configured to control the transmitter unit and the receiver unit to form the wireless access interface providing a plurality of communications resource elements across a first frequency bandwidth which are divided in time into a plurality of frames and forms one of a plurality of cells of the mobile communications network, each cell being allocated a cell identifier by the mobile communications network. The controller in combination with the transmitter unit are configured to transmit in one or more of the frames a synchronisation sequence, which is one of a set of possible synchronisation sequences, each of the synchronisation sequences from the set providing an indication of one of the cell identifiers, wherein a relative temporal location of the synchronisation sequence within the frame provides the communications devices with an indication of the cell identifier of the cell which can be combined with detecting the synchronisation sequence to improve the estimate of the cell identifier for the cell.

In another example a communication device is configured to transmit data to and receive data from the mobile communications network. The communications device includes a controller which is configured in combination with the receiver unit to detect the synchronisation sequence as being one of the predetermined set of synchronisation sequences, to calculate an estimate of a cell identifier of the cell using the detected synchronisation sequence, and to use the cell identifier to transmit the data to and/or receive the data from the mobile communications network via the wireless access interface. A relative temporal location of the synchronisation sequence within the frame provides the communications device with an indication of the cell identifier of the cell, and the controller is configured to calculate the estimate of the cell identifier based on the relative temporal location in the frame of the synchronisation sequence in combination with the detected synchronisation sequence.

According to some examples a communications device can restrict a search for the correct cell identifier based on an identification of a relative temporal location in which the synchronisation sequence was transmitted. In one example the synchronisation sequence itself may identify a group of cell identifiers and the relative temporal location may identify the group of cell identifiers or a subset of the group and the cell identifier may be identified using a further synchronisation sequence.

Embodiments of the present disclosure can provide an arrangement in which a communications device can reduce a probability of missed detection of a cell identifier of a transmitting cell, such as for example a physical-layer cell identifier (PCI) therefore reducing an acquisition time for a communications device to acquire the correct PCI for a cell via which the communications device is to transmit and receive data. Correspondingly for the same probability of correctly detecting the cell identifier of a cell, a range of the cell in which communications device is operating may be effectively extended. This is because in some communications systems, control and signalling information is encoded with the cell identifier and so the communications devices must detect the cell identifier in order to communicate via a cell of the communications network. Therefore by increasing a probability of correctly detecting the cell identifier, the range of the cell from the base station through which the communications device is transmitting and receiving is equivalently increased. This can therefore improve the coverage of a cell, allowing it to reach locations where cell acquisition signalling would be more difficult to detect successfully by communications devices within the same performance requirements specified for communications systems.

In some examples communications devices may be disposed in locations providing a poor radio reception environment. In some examples the communications devices are reduced capability devices such as MTC devices, such as smart meters which may be installed in residential basements where the radio signals experience significant propagation losses. Similarly, communications devices experiencing significant down-link inter-cell interference may be able to acquire the cell identifier more easily using the arrangement disclosed and so improve a likelihood of being able to correctly communicate via the mobile communications network. A number of failed attempts at acquiring a cell could also be reduced, for example where the communications device can only weakly receive synchronisation signals conveying the cell identifier, because a probability of failure is reduced. This could tend to reduce communications device power consumption and could improve mobile device battery life.

Various further aspects and embodiments of the disclosure are provided in the appended claims, including but not limited to, an infrastructure equipment (or network element of a mobile communications network), a communications device and method of communicating to a communications device using a mobile communications network element.

BRIEF DESCRIPTION OF DRAWINGS

Embodiments of the present disclosure will now be described by way of example only with reference to the accompanying drawings in which like parts are provided with corresponding reference numerals and in which.

DESCRIPTION OF EXAMPLE EMBODIMENTS

Example Network

Figure 1:
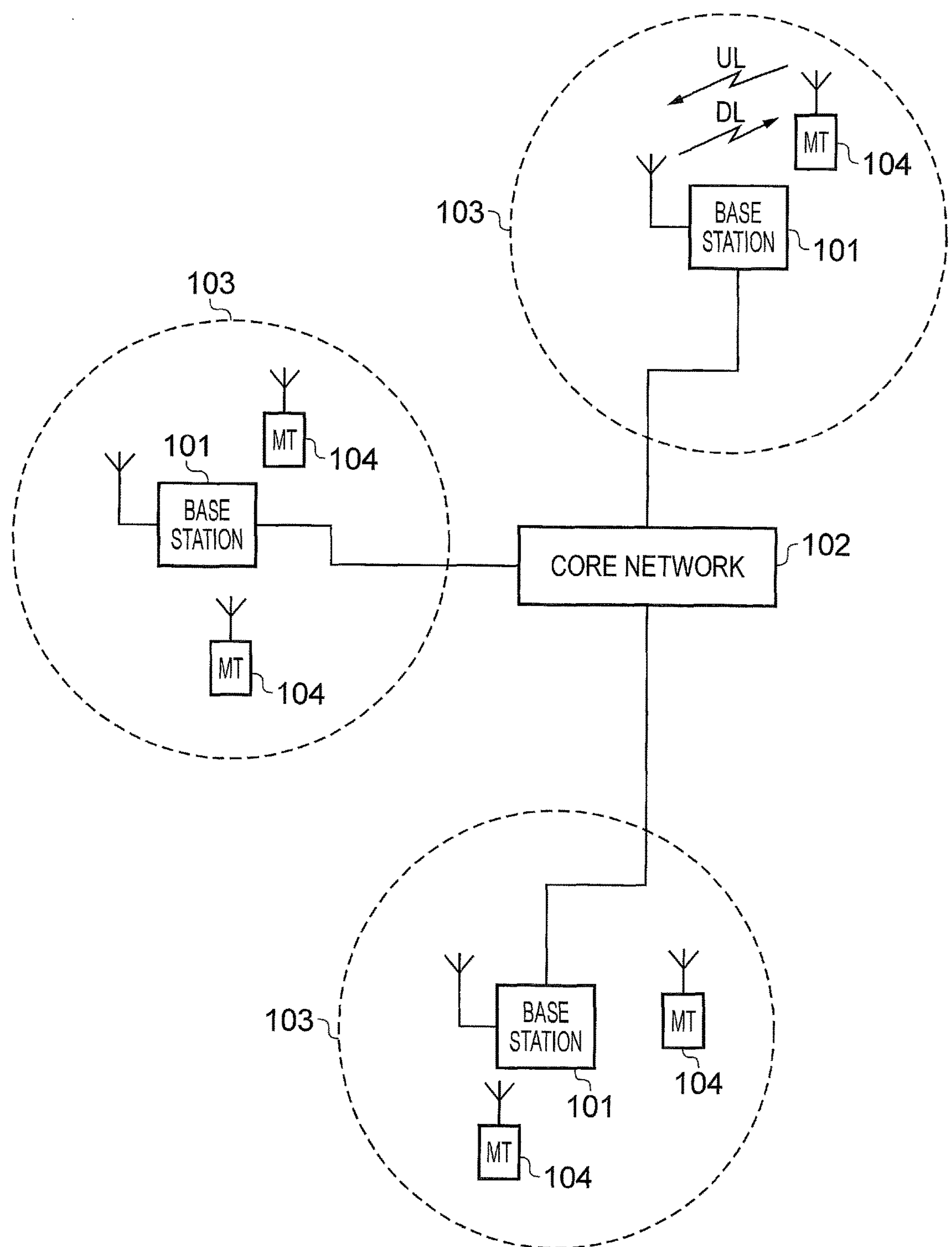
FIG. 1 provides a schematic diagram illustrating an example of a conventional mobile communications system.

FIG. 1 provides a schematic diagram illustrating the basic functionality of a conventional mobile communications system. In FIG. 1, a mobile communications network includes a plurality of base stations 101 connected to a core network 102. Each base station provides a coverage area 103 (i.e. a cell) within which data can be communicated to and from communications devices 104. Data is transmitted from a base station 101 to a communications device 104 within a coverage area 103 via a radio downlink. The data is transmitted from a communications device 104 to a base station 101 via a radio uplink. The core network 102 routes the data to and from the base stations 104 and provides functions such as authentication, mobility management, charging and so on. The base stations 101 provide a wireless access interface comprising the radio uplink and the radio downlink for the communications devices and form examples of infrastructure equipment or network elements for the mobile communications network, and may be, for the example of LTE, an enhanced Node B (eNodeB or eNB).

The term communications devices will be used to refer to a communications terminal or apparatus which can transmit or receive data via the mobile communications network. Other terms may also be used for communications devices such as personal computing apparatus, remote terminal, transceiver device or user equipment (UE) which may or may not be mobile.

Figure 2:
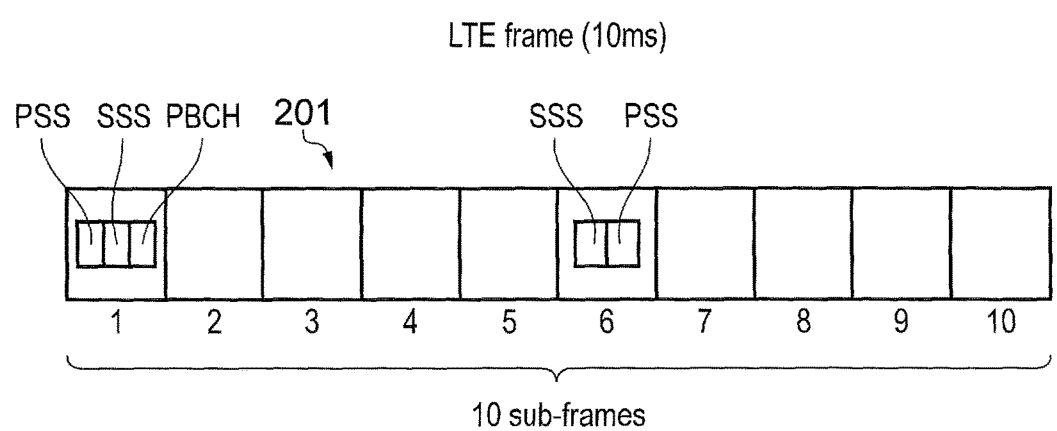
FIG. 2 provides a schematic diagram illustrating an arrangement of channels of a wireless access interface for ten down-link sub-frames of a conventional LTE wireless access interface.

Mobile telecommunications systems such as those arranged in accordance with the 3GPP defined Long Term Evolution (LTE) architecture use an orthogonal frequency division multiplex (OFDM) based radio access interface for the radio downlink (so-called OFDMA) and the radio uplink (so-called SC-FDMA). Data is transmitted on the radio uplink and on the radio downlink on a plurality of orthogonal sub-carriers. FIG. 2 shows a schematic diagram illustrating an OFDM based LTE downlink radio frame 201. The LTE downlink radio frame is transmitted from an LTE base station and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames (conventionally numbered as sub-frame 0 and 5) of the LTE frame, in the case of frequency division duplex (FDD) system. A physical broadcast channel (PBCH) is transmitted in the first sub-frame of the LTE frame. The PSS, SSS and PBCH are discussed in more detail below.

Figure 3:
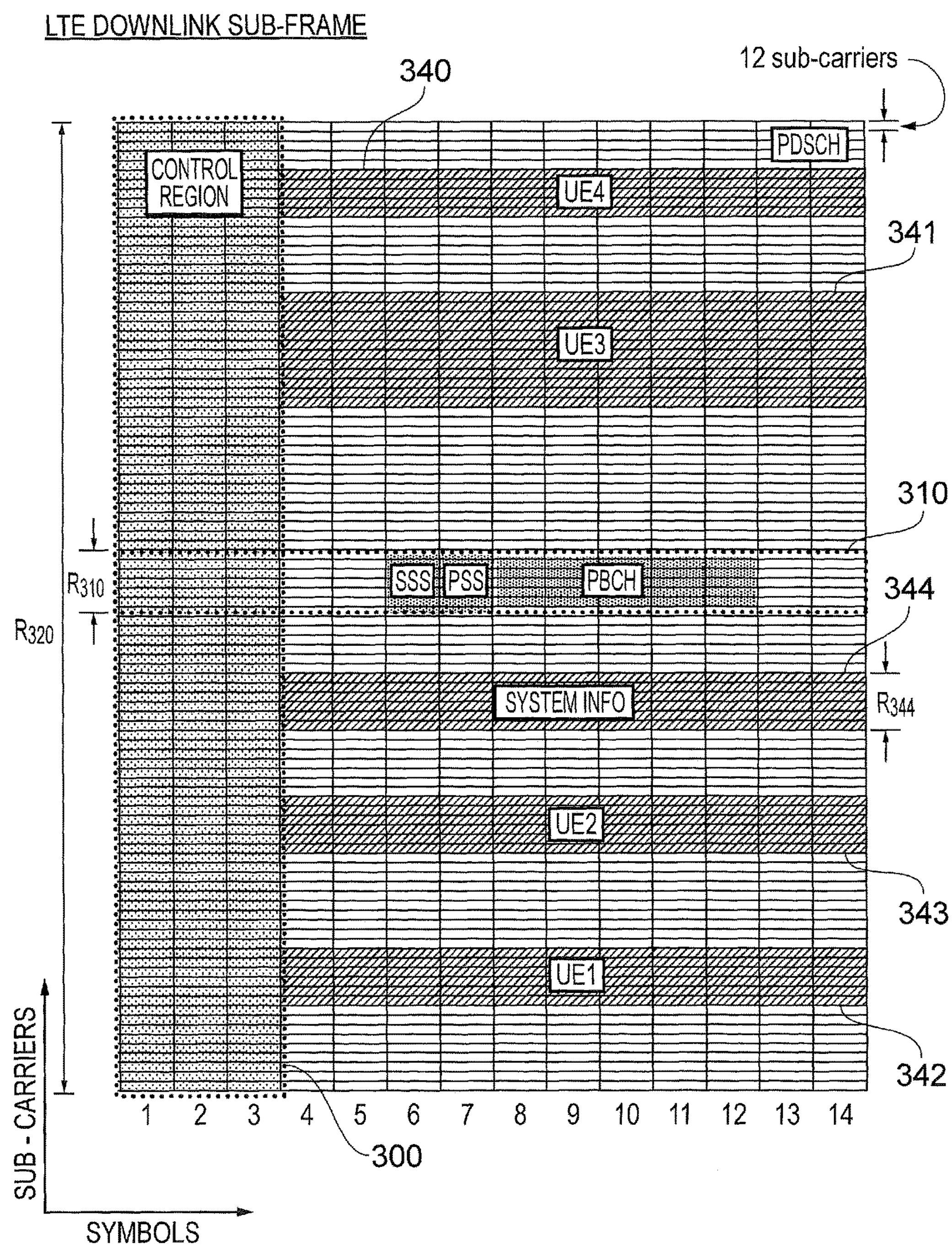
FIG. 3 provides a schematic diagram illustrating a conventional LTE downlink radio sub-frame.

FIG. 3 provides a schematic diagram providing a grid which illustrates the structure of an example of a conventional downlink LTE sub-frame. The sub-frame comprises a predetermined number of symbols which are transmitted over a 1 ms period. Each symbol comprises a predetermined number of orthogonal sub-carriers distributed across the bandwidth of the downlink radio carrier.

The example sub-frame shown in FIG. 3 comprises 14 symbols and 1200 sub-carriers spaced across a 20 MHz bandwidth. The smallest unit on which data can be transmitted in LTE is twelve sub-carriers transmitted over one sub-frame. For clarity, in FIG. 3, each individual resource element is not shown, but instead each individual box in the sub-frame grid corresponds to twelve sub-carriers transmitted on one symbol.

FIG. 3 shows resource allocations for four communications devices 340, 341, 342, 343. For example, the resource allocation 342 for a first communications device (UE 1) extends over five blocks of twelve sub-carriers, the resource allocation 343 for a second communications device (UE2) extends over six blocks of twelve sub-carriers and so on.

Control channel data is transmitted in a control region 300 of the sub-frame comprising the first n symbols of the sub-frame where n can vary between one and three symbols for channel bandwidths of 3 MHz or greater and where n can vary between two and four symbols for channel bandwidths of 1.4 MHz. The data transmitted in the control region 300 includes data transmitted on the physical downlink control channel (PDCCH), the physical control format indicator channel (PCFICH) and the physical HARQ indicator channel (PHICH).

The PDCCH contains control data indicating which subcarriers on which symbols of the sub-frame have been allocated to specific communications devices (UEs). Thus, the PDCCH data transmitted in the control region 300 of the sub-frame shown in FIG. 3 would indicate that UE1 has been allocated the first block of resources 342, that UE2 has been allocated the second block of resources 343, and so on. In sub-frames where it is transmitted, the PCFICH contains control data indicating the duration of the control region in that sub-frame (i.e. between one and four symbols) and the PHICH contains HARQ (Hybrid Automatic Request) data indicating whether or not previously transmitted uplink data has been successfully received by the network.

In certain sub-frames, symbols in a central band 310 of the sub-frame are used for the transmission of information including the primary synchronisation signal (PSS), the secondary synchronisation signal (SSS) and the physical broadcast channel (PBCH) mentioned above. This central band 310 is typically 72 sub-carriers wide (corresponding to a transmission bandwidth of 1.08 MHz). The PSS and SSS are synchronisation sequences that once detected allow a communications device 104 to achieve frame synchronisation and determine the cell identity of the base station (eNB) transmitting the downlink signal. The PBCH carries information about the cell, comprising a master information block (MIB) that includes parameters that the communications devices require to access the cell. The data transmitted to individual communications devices on the physical downlink shared channel (PDSCH) can be transmitted in the remaining blocks of communications resource elements of the sub-frame.

FIG. 3 also shows a region of PDSCH containing system information and extending over a bandwidth of $R_{344}$. Thus in FIG. 3 the central frequency carries control channels such as the PSS, SSS and PBCH and therefore implies a minimum bandwidth of a receiver of a communications device.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth as shown in FIG. 3. As is known in the art, subcarriers carrying data transmitted on the PDCCH, PCFICH and PHICH are typically distributed across the entire bandwidth of the sub-frame. Therefore a conventional communications device must be able to receive the entire bandwidth of the sub-frame in order to receive and decode the control region.

Virtual Carrier

Certain classes of communications devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional communications devices. Communications devices may include a high-performance LTE receiver unit capable of receiving and processing data from an LTE downlink frame across the full carrier bandwidth. However, such receiver units can be overly complex for a device which only needs to transmit or to receive small amounts of data. This may therefore limit the practicality of a widespread deployment of reduced capability MTC type devices in an LTE network. It is preferable instead to provide reduced capability devices such as MTC devices with a simpler receiver unit which is more proportionate with the amount of data likely to be transmitted to the device. Furthermore the receiver may be less sensitive.

In conventional mobile telecommunication networks, data is typically transmitted from the network to the communications devices in a frequency carrier (host frequency range) where at least part of the data spans substantially the whole of the bandwidth of the frequency carrier. Normally a communications device cannot operate within the network unless it can receive and decode data spanning the host frequency carrier, i.e. a maximum system bandwidth defined by a given telecommunication standard, and therefore the use of communications devices with reduced bandwidth capability transceiver units is precluded.

However, as disclosed in co-pending International patent applications numbered PCT/GB2012/050213, PCT/GB2012/050214, PCT/GB2012/050223 and PCT/GB2012/051326, the contents of which are herein incorporated by reference, a subset of the communications resource elements comprising a conventional carrier (a "host carrier") are defined as a "virtual carrier", where the host carrier has a certain bandwidth (first frequency range) and where the virtual carrier has a reduced bandwidth compared to the host carrier's bandwidth. Data for reduced capability devices is separately transmitted on the virtual carrier set of communications resource elements. Accordingly, data transmitted on the virtual carrier can be received and decoded using a reduced complexity or capability transceiver unit. The virtual carrier therefore provides a section of the host carrier bandwidth containing, within a restricted bandwidth, communications resource elements which are reserved or at least preferably allocated to reduced capability devices.

Communications devices provided with reduced complexity or capability transceiver units (hereafter referred to as "reduced capability devices") could operate by using a part of its full capability (i.e. reduced capability set of its full capability) or they could be constructed to be less complex and less expensive than conventional LTE type devices (onwards referred to generally as communications devices).

Accordingly, the deployment of such devices for MTC type applications within an LTE type network can become more attractive because the provision of the virtual carrier allows communications devices with less expensive and less complex transceiver units to be used.

Figure 4:
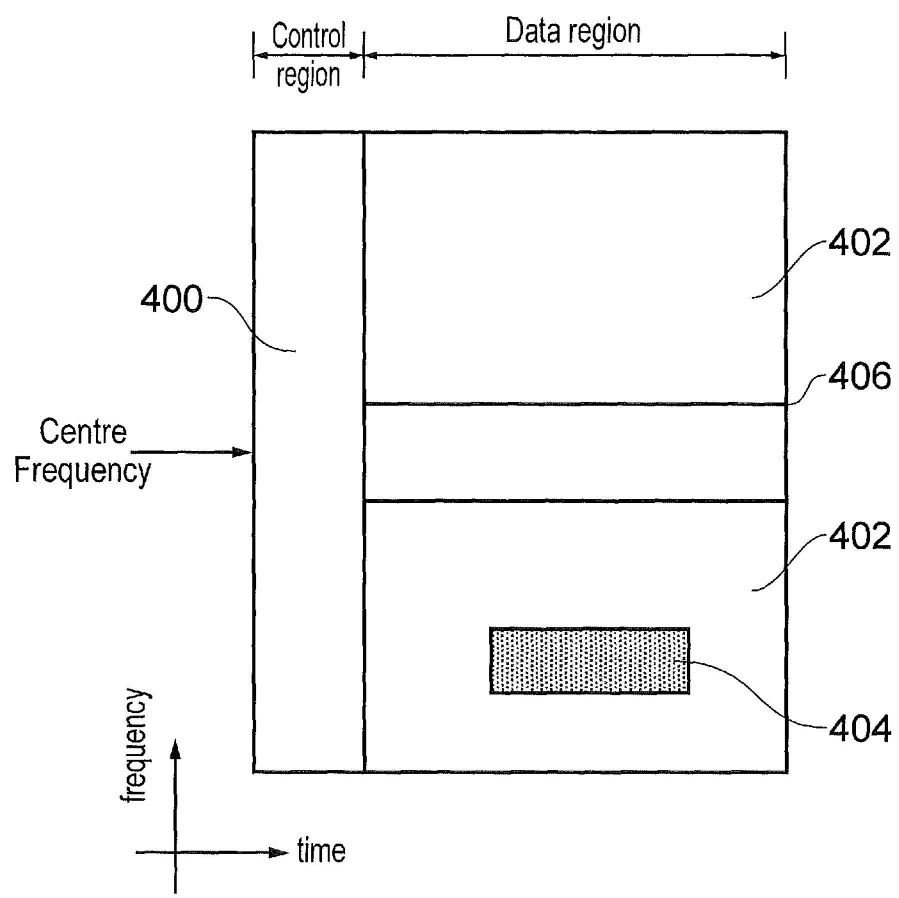
FIG. 4 provides a schematic diagram illustrating an example of an LTE downlink radio sub-frame in which a narrow band virtual carrier has been inserted at the centre frequency of the host carrier, the virtual carrier region is shown adjacent a wideband control region of the host carrier.

FIG. 4 schematically represents an arbitrary downlink sub-frame according to the established LTE standards as discussed above into which an instance of a virtual carrier 406 has been introduced. The sub-frame comprises a control region 400 supporting the PCFICH, PHICH and PDCCH channels as discussed above and a PDSCH region 402 for communicating higher-layer data (for example user-plane data and non-physical layer control-plane signalling) to respective communications devices, as well as system information, again as discussed above. The control region 400 and the shared communications resources (PDSCH) 402 therefore can occupy the entire system or host carrier bandwidth. For the sake of giving a concrete example, the frequency bandwidth (BW) of the carrier with which the sub-frame is associated is taken to be 20 MHz.

Also schematically shown in FIG. 4 by a shaded region 404 within the shared resources 402 is an example PDSCH downlink allocation to a conventional communications device. In accordance with the defined standards, and as discussed above, individual communications devices derive their specific downlink allocations 404 for a sub-frame from PDCCH transmitted in the control region 400 of the sub-frame.

By contrast with the conventional LTE arrangement, where a subset of the available PDSCH resources anywhere across the full PDSCH bandwidth could be allocated to a communications device in any given sub-frame, in the T-shaped arrangement illustrated in FIG. 4, reduced capability devices maybe allocated PDSCH resources only within a pre-established reserved frequency bandwidth 406 corresponding to a virtual carrier. Accordingly, reduced capability devices each need only buffer and process a small fraction of the total PDSCH resources contained in the sub-frame to identify and extract their own data from that sub-frame.

The pre-established reserved frequency bandwidth used to communicate, e.g. on PDSCH in LTE, from a base station to a communications device, is thus narrower than the overall host frequency bandwidth (carrier bandwidth) used for communicating physical-layer control information, e.g. on PDCCH in LTE. As a result, base stations 101 may be configured to allocate downlink resources for the reduced capability device on the PDSCH 402 only within the reserved frequency bandwidth 406. As the communications device knows in advance that it will only be allocated PDSCH resources within the restricted frequency band, the communications device does not need to buffer and process any PDSCH resources from outside the pre-determined restricted frequency band.

Example Synchronisation Sequences

As will be appreciated in accordance with known arrangements, the PSSS/SSS is provided in order for the communications devices to be able to synchronise to the wireless access interface provided by the base stations 101 operating within a cell and also to provide a physical layer cell identity (PCI). In LTE, a PCI is associated with each cell of a mobile communications network. There are five hundred and four PCIs, made up of one hundred and sixty eight groups each containing three identities. The PSS is used to indicate the cell identity within a group and the SSS indicates the identity of the group. An LTE network as currently known is planned on a cell identifier basis since the PCIs when embedded in PSS/SSS transmissions have good de-correlation properties allowing communications devices to detect differing cell identities in deployments with frequency reuse factor one.

In current releases of LTE, the PSS and SSS are both transmitted over the central sixty three subcarriers of the system bandwidth, with the d.c. subcarrier punctured. This allows a communications device to detect the transmissions without knowing the system bandwidth. The two sequences are both transmitted in two slots per radio frame according to the tables below, with slots and symbols numbered from zero within each radio frame.

In FDD, the SSS is in the OFDM symbol immediately before the PSS, allowing coherent detection on the assumption that the radio channel's coherence time is significantly longer than an OFDM symbol. In TDD, the SSS is three OFDM symbols before the PSS, meaning that coherent detection can be used only if the radio channel's coherence time is significantly longer than four OFDM symbols. If the communications device detects the PSS first, it can use this to estimate the channel and coherently detect the SSS. The communications device needs to blindly detect which cyclic prefix configuration is in use given the FDD/TDD mode (which might also need blind detection).

Example implementation of synchronisation sequences for the PSSs which have been adopted for LTE are three possible PSS, each comprising length-sixty three Zadoff-Chu sequences. Each SSS is a frequency-domain interleaving of two length-thirty one secondary synchronisation codes, which themselves are two different cyclic shifts of a single length-thirty one M-sequence. The two secondary synchronisation codes are alternated between the two SSS transmissions in a radio frame, allowing a communications device to determine radio frame timing from a single observation of an SSS.

Time Location Transmission of PSS/SSS

As will be appreciated a coverage area provided by a cell will be limited in dependence upon the distance of a communications device from a base station or a radio environment experienced by a communications device. It is expected in the future that a low-cost MTC type devices which may be utilising a virtual carrier provided by the mobile communications network may be disposed in an environment where it may be difficult to receive the PSS/SSS. Alternatively the sensitivity of a receiver of the MTC device may be lower than a conventional device in order to reduce costs.

The conventional arrangement shown above transmits a PSS/SSS in the same sub-frame for each of the cells throughout a mobile communications network. The present technique provides an arrangement for a synchronisation sequence to be transmitted at different temporal locations within a frame for each cell. The temporal location of the synchronisation sequence or sequences provides an indication of a cell identifier such as a PCI or a group of cell identifiers (PCIs) which is also conveyed by the synchronisation sequence itself. In the examples given below, which generally conform to current proposals (releases) for LTE, the synchronisation sequence comprises two parts which are the primary synchronisation sequence (PSS) and secondary synchronisation sequence (SSS), which have been explained above with reference to FIGS. 1 to 4. As explained above, embodiments of the present technique can therefore provide in one example an arrangement for varying a position of an additional transmission of either or both of the PSS and the SSS in a frame or a sub-frame. This arrangement will be explained in more detail in the following section. However it will be appreciated that one or both of the PSS and the SSS may vary in its temporal location within a frame so that the expression PSS/SSS should be interpreted as being PSS and/or SSS.

It is known from 3GPP LTE technical document R1-072050 to provide an arrangement in which a spacing between transmissions of the synchronisation signals is used to indicate transitions system frame number (SFN). In one example, in the last radio frame of a super frame, the positions of the PSS/SSS in the first slot are different to in the second slot. A communications device can therefore determine SFN transition by detecting the PSS/SSS.

In contrast, embodiments of the present technique arrange the symbol spacing of the PSS/SSS transmissions to convey further information to the communications device. The further information conveyed by a time-domain placement of the PSS/SSS transmissions is relevant to the contents of the synchronisation sequences themselves, rather than to some other aspect of the network. Additionally, the PSS/SSS convey a PCI and/or SSS (or in lesser case PSS), rather than SFN. Finally, the proposal in R1-072050 does not propose that the symbol spacing of the PSS/SSS transmissions can be different per cell served by a base station.

A 3GPP technical document R1-112469 proposes to use an 'auxiliary' PSS/SSS to aid cell acquisition in a case of heavy inter-cell interference. The auxiliary PSS/SSS are transmitted in different OFDM symbols to the legacy sequences, and there are proposals included to add the use of so-called 'almost blank sub-frames' and other resource muting approaches. However this represents a mere repetition of the PSS/SSS and the temporal position of the auxiliary PSS/SSS provides no significance in this proposal in contrast to embodiments of the present technique.

Example embodiments of the present disclosure provide an arrangement in which the PSS transmission timing can be used to restrict the SSS detection options for communications devices (and possibly also PCI). By focussing on the SSS, an advantage is provided because de-correlation properties of M-sequences are weaker than for the Zadoff-Chu sequences used for the PSS, so acting to reduce a probability of missed detection ($P_{MD}$) of the SSS, which is more desirable. Some embodiments can provide an advantage when used with a wireless access interface formed with an unsynchronised new carrier type (NCT) because enhancements described above can be obtained without needing more than two transmissions of synchronisation sequences, resulting in no or at least reduced additional overhead. The new carrier type (NCT) will be explained in more detail below. Embodiments of the present technique also provide an advantage with respect to a virtual carrier (VC) deployment explained above. Consider a deployment where a VC is not based around central resource blocks of a host carrier. A base station could be configured to provide a VC in which a PSS/SSS could be transmitted repeatedly within the resources of the VC rather than a host carrier HC, the transmission of the PSS/SSS within the VC being arranged at a temporal location which represents the PCI conveyed by the PSS/SSS itself without affecting synchronisation of other communications devices operating on the host carrier. This removes a need for the VC communications device to access the host carrier's synchronisation signals, thus allowing the communications device to be a strictly narrowband device, which could significantly reduce its cost and power consumption.

Figure 5:
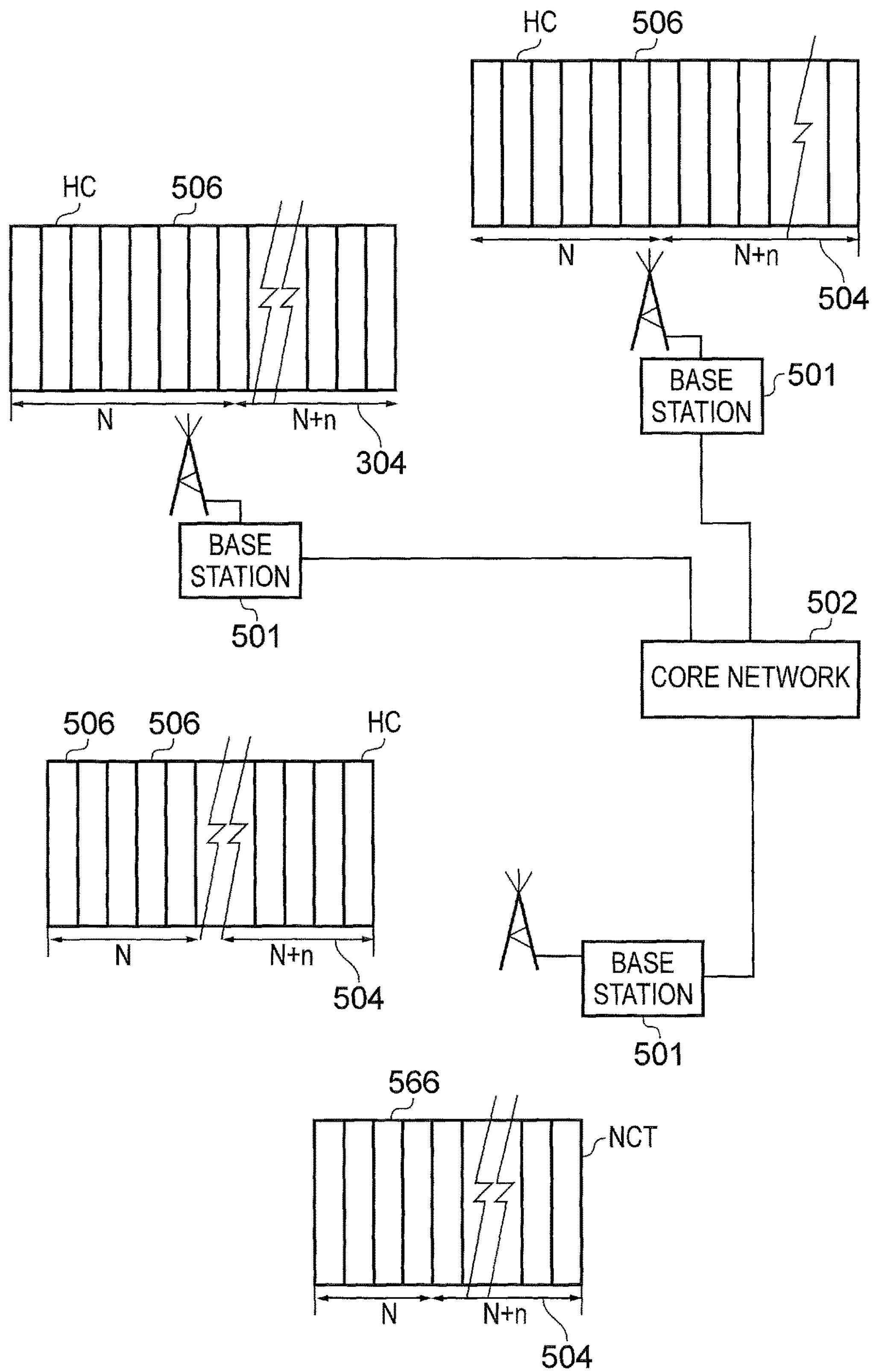
FIG. 5 provides a schematic diagram illustrating an example of a mobile communications system corresponding to the example shown in FIG. 1, with example wireless access interfaces.

An example illustration of a mobile communications network operating in accordance with the present technique is shown in FIG. 5. In FIG. 5 the mobile locations network includes base stations 501 which are connected to a core network 502 and operate substantially as explained above with reference to FIG. 1. As shown in FIG. 5 each of the base stations 501 serves to form a cell of the mobile communications network by arranging for a transmitter and receiver within the base station to transmit and receive signals in accordance with a wireless access interface defined by a scheduler within the base station 501. Each of the base stations 501 therefore provides a host carrier HC. As explained above, the wireless access interface within a host frequency bandwidth is divided in time into frames. Each of the frames includes ten sub-frames. Thus as shown in FIG. 5 each of the host carriers HC include frames 504 which are divided into sub-frames 506. However it has been proposed to provide a further carrier for one or more cells of the mobile communications network which may be transmitted in addition to the host carrier HC or in some examples may be instead of the host carrier HC. Thus as shown in FIG. 5 one of the base stations 501 provides a so-called new carrier type (NCT) which also provides a wireless access interface within the host frequency bandwidth which is divided into frames 504 and sub-frames 506.

It has been proposed that in contrast to a conventional host carrier, an NCT will have significantly reduced overhead compared to conventional carriers complying with LTE release 11 and earlier specifications. The NCT is intended initially for deployment in a carrier aggregation (CA) scenario, where an NCT would typically be a secondary component carrier (SCC) with a legacy carrier as the primary component carrier (PCC). An NCT may be either synchronised with the PCC or unsynchronised. In the synchronised case, the NCT need not transmit PSS/SSS since the communications device will acquire synchronisation (and other timing related information) from the legacy PCC. In the unsynchronised case, the NCT will transmit its own synchronisation signals and the communications device will acquire timing information separately for the legacy PCC and NCT SCC. Further differences on the NCT include the expectation that cell-specific reference signals (CRS) will be transmitted: across a bandwidth potentially much smaller than the system bandwidth of a host carrier HC; on only a single antenna port (compared to up to four ports on legacy carriers), and at a reduced, for example 5 ms, periodicity (compared to every sub-frame on legacy carriers). Additionally, that in a so-called 'standalone' case where an NCT is not aggregated with a legacy carrier, the NCT may not transmit any legacy PDCCH, relying instead solely on EPDCCH.

As mentioned above, a cell's coverage can be limited by a distance from the base station 501 at which communications devices 101 are still able to successfully detect and correctly decode the PSS and SSS to determine frame timing, SFN and PCI. A simple method to improve coverage would be to add further repetitions of PSS and/or SSS into each radio frame, in addition to the already scheduled transmissions in the first and sixth sub-frames 0 and 5. This would tend to target improved probability of missed detection, $P_{MD}$, and acquisition time primarily, but would come at a cost of increased overhead in each radio frame, and therefore reduced user-plane capacity on PDSCH. It is therefore desirable to develop methods for obtaining further performance improvement from PSS/SSS in the case that they are being repeated in additional sub-frames of a radio frame to make the most efficient use of the increased overhead.

Figure 6:
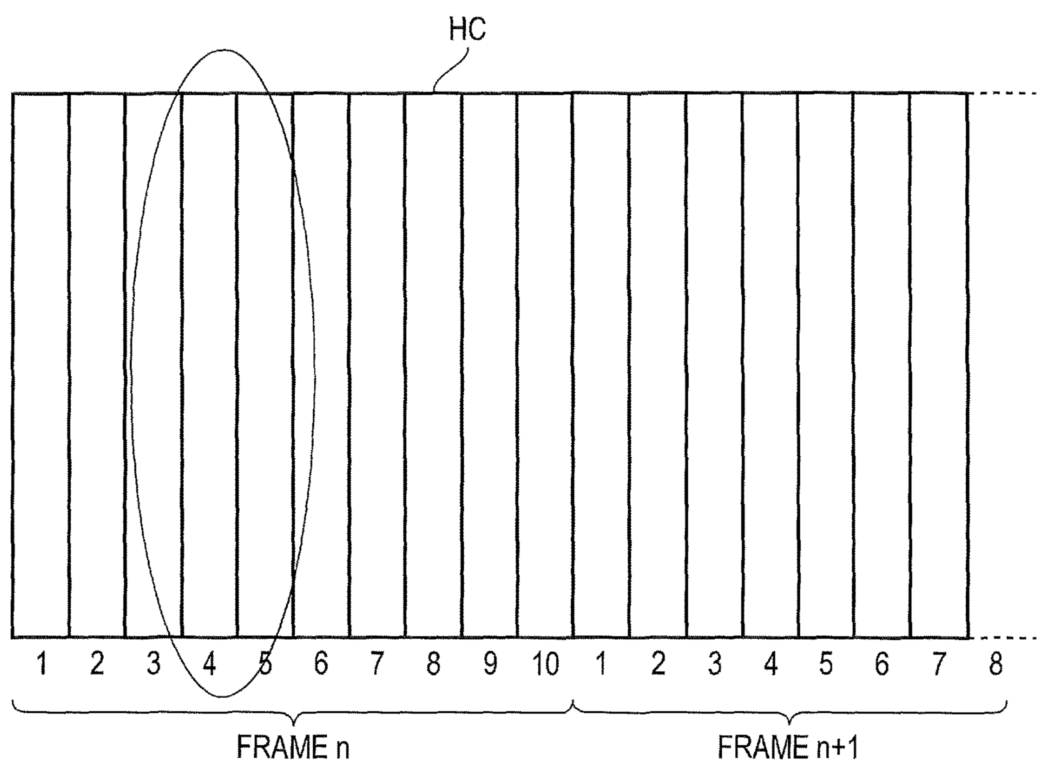
FIG. 6 provides a schematic representation of the wireless access interfaces shown in FIG. 5, showing sub-frames within a plurality of frames.

FIG. 6 provides a more detailed representation of the frames of the host carrier HC or the NCT shown in FIG. 5. As explained above there are ten sub-frames within each frame. Also explained above is the breakdown of the resource elements for each sub-frame as illustrated for example in FIG. 3 and represented in a more simplified form in FIG. 6.

In the following description an example of a wireless access interface which is arranged in accordance with FDD transmission with normal cyclic prefix (CP), but in other examples TDD may be used. In general it is assumed that the transmissions of PSS/SSS in sub-frames 0 and 5 of a radio frame, as described in current LTE specifications for FDD, will occur as usual. In order to improve coverage and acquisition time, and by way of non-limiting example, at least one additional transmission (i.e. at least three in total) of at least one of PSS and SSS will also occur within the radio frame in addition to the transmission of the PSS/SSS in sub-frames 0 and 5 of a radio frame. Such additional transmissions would have the potential to disturb the synchronisation process of legacy communications devices, which are not expecting the transmission of the additional PSS/SSS. This is particularly true of the PSS since a legacy device could detect a new PSS transmission and then find apparently inconsistent transmissions in the (legacy) sub-frames 0 and 5. The effect of this would be implementation specific, but could in general be expected to slow the cell acquisition process. A solution to this is to generate new PSSs for use in such scenarios, e.g. by using different cyclic shifts of the Zadoff-Chu sequence that constructs them (see above). This would lose the repetition combining gain for advanced communications devices, but prevent disturbance to legacy devices.

As indicated above, embodiments of the present technique would be unaffected in either case. For the SSS, legacy devices with a suitable implementation should be unaffected by additional repetitions, since they will acquire slot (and sub-frame) timing from the PSS and will thus have the conventional expectation regarding when the SSS should occur and could implicitly ignore any 'unexpected' transmissions. However, in general, embodiments of the present technique could provide an arrangement in which there is only one PSS/SSS transmission within a radio frame.

Figure 7:
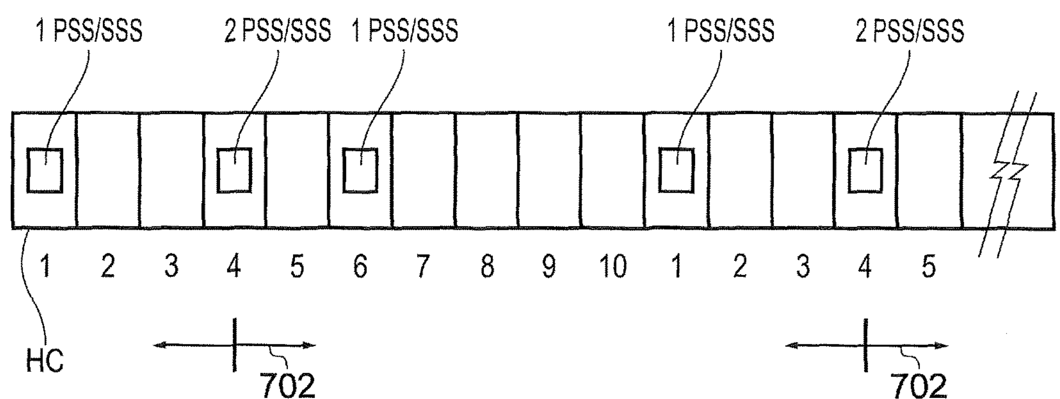
FIG. 7 provides a schematic diagram illustrating an example arrangement of synchronisation sequences of a wireless access interface for ten down-link sub-frames in accordance with the present technique.

FIG. 7 provides an example illustration of one embodiment of the present technique. As shown in FIG. 2, and explained above, for each frame a PSS/SSS is transmitted in the same sub-frame for example sub-frame one and sub-frame six of a frame. However a secondary or additional transmission of one or both of the PSS/SSS within a frame is provided in this example in sub-frame four. The temporal location of the additional transmission of the second PSS/SSS is allowed to vary within the frame on a cell by cell basis. Accordingly a mobile communications device is arranged to determine the PCI of the cell, based on a relative temporal position of the additional transmission of the PSS/SSS 700. In one example the temporal location of one or both of the PSS/SSS is provided by indicating a group of possible PCI values to which the PCI of the cell belongs. Arrows 702 shown in FIG. 7 illustrate that unlike the transmission of the first PSS/SSS which always occurs in the same sub-frame for all cells in the mobile communications network, the transmission of the second PSS/SSS may vary within the sub-frame or between sub-frames of the frame.

For the example of the NCT, it is possible that no first primary or secondary synchronisation sequences are transmitted. In this example, communications devices which access communications resources of the NCT will first gain synchronisation with the other host carrier HC, from which the devices will obtain timing, and synchronisation with the mobile communications network etc. However, if an NCT is not synchronised to a legacy carrier, it will transmit its own PSS/SSS and in general it is possible that these synchronisation sequences may not be in the same form as has been proposed for previous releases for LTE (Release-11 locations) or indeed may comprise different type of synchronisation sequences. A communications device which is adapted in accordance with the present technique to transmit and receive data via a mobile communications network which transmits time varying synchronisation sequences to assist in the acquisition of the PCI. Such communications devices may also include devices which communicate via a virtual carrier VC, such as an MTC device or a device referred to generally as a VC communications device. In contrast a "legacy" communications device is not able to operate to take advantage of the present technique because it is only configured to acquire the PCI for a cell and synchronise to a mobile communications network using the conventional deployment of the PSS/SSS, which are in the same position for all cells.

PCI Subset Restriction by SS Repetition Sub-Frame Hopping

As will be appreciated from the above explanation a conventional LTE carrier HC may be adapted to transmit a third repetition of the PSS/SSS in a sub-frame n different to 0 and 5. This third transmission may occur in any fixed OFDM symbol s of sub-frame n, but without loss of generality it may be simpler for communications device implementation that it occurs in the same OFDM symbol as the currently-specified repetitions (see table above). In this embodiment, the sub-frame in which the third repetition occurs implies a subset of PCIs that the communications device is expected to search, thus reducing a probability of missed detection ($P_{MD}$) and acquisition time. To do this, the communications device could typically search for the presence of the third repetition of the PSS in sub-frames other than 0 and 5 by correlating the possible PSS sequences with what the communications device receives in the relevant resource elements (of OFDM symbol s, in the example) in those other sub-frames. If any of them are considered to match, using any suitable well-known method, then the communications device can conclude that the carrier HC transmitted by the cell provides a wireless access interface adapted in accordance with the present technique.

Having reached such a conclusion, there are up to eight possible sub-frames that could have been chosen by the base station 101, allowing the communications device's to determine a PCI, but assisted by using the temporal location of the PSS/SSS to confine the search of the PCI to be within one of eight possible subsets. One example embodiment could be that only the SSS is in fact confined to a subset, since the communications device has already detected a PSS. In another example, the overall PCI is confined to a subset, determined from the temporal location of the PSS or the SSS, allowing the communications device the possibility of revising its original detection of even the first estimate of the identity of the PCI carried on the PSS.

The subsets to which the SSS or PCI is confined could be:

Continuous and either ordered or in no particular order across the whole set of SSSs or PCIs. For example if there are N SSS/PCI values, numbered 0 . . . N with the additional repetition detected in sub-frame n, sets of confined values could be:

Ordered–n=0: {0, 1, . . . , (N/8)−1}, n=1: {N18, . . . , (2N/8)−1}, . . . , n=7: {7N/8, (N−1)}. In general, for n=p: {Np/8, (Np/8)+1, . . . , N(p+1)/8−1}.

Unordered–n=0: {3N/8, . . . , (4N/8)−1}, n=1: {0,1, . . . , (N/8)−1}, . . . , n=7: {N18, . . . , (2N/8)−1}.

Discontinuous and either ordered or in no particular order across the whole set of SSSs or PCIs. This could mean that some values are excluded from operation. Continuing the above example, one discontinuous and ordered arrangement is:

n=0: {0, 1, . . . , (N/8)−3}, n=1: {N18, . . . , (2N/8)−2}, . . . n=7: {7N/8, . . . (N−1)}, where there are some gaps, positioned arbitrarily in this example, in permissible values.

Any collections of possible values, e.g. n=0: {3, 7, 99, 112, . . . }, n=1: {34, 77, 82, . . . }, . . . which could together cover all or only some of the possible values.

As will be appreciated from the embodiments explained above, the mobile communications network may be configured to broadcast the association of a sub-frame for the third repetition to a subset of SSSs or PCIs from a cell by the base station 101 or could be defined in specifications. In general, not all sub-frames may be permitted for the third PSS/SSS repetition to be transmitted, in which case the number of possible confined sets is correspondingly smaller.

In a further example embodiment, one or other of the two current transmissions of PSS/SSS are allowed to occur in any sub-frame, rather than being limited to sub-frames 0 and 5. For example, the first transmission could still be in sub-frame 0, but the second could be allowed to move, and the sub-frame in which the second transmission is detected acts in the way of the third transmission described above. This example avoids the increased overhead of having a third transmission, but could prevent legacy communications devices from accessing the carrier if the second transmission were not in sub-frame 5. Therefore, this example could be more applicable to an unsynchronised NCT which transmits its own synchronisation sequence(s) without backward compatibility requirements.

For the example of a conventional host carrier in which a third transmission of the PSS/SSS is allowed to vary between cells in time in accordance with the present technique, a legacy communications device may not be configured to be aware of this additional transmission of the PSS/SSS which could puncture the PDSCH with no ability for the base station to signal this to the legacy communications device, that this puncturing of the PDSCH by the transmission of the PSS/SSS has occurred. This would tend to degrade the legacy communications device's decoding of PDSCH. Furthermore, the additional repetitions would potentially collide with reference signals (RS) and transmissions such as PBCH if they were carried in certain OFDM symbols of certain sub-frames. In these examples, in order for transmissions of the PDSCH or PBCH which are expected by legacy communications devices to be unaffected by the additional transmission of the PSS/SSS, then embodiments arrange for the additional PSS/SSS transmissions to be prohibited from being sent in sub-frames or physical resources where collisions would occur on such OFDM symbols (which could reduce the number of sets into which PCI/SSS could be divided).

Blind Search Between Cyclic Prefix (CP) Length and FDD/TDD

In some embodiments it may be necessary for the communications device to be able to distinguish at least between the two CP lengths, and potentially also between FDD and TDD operation if the communications device supports both. In this embodiment, if the OFDM symbol separation is kept the same as explained above, and different between FDD and TDD then a communications device can still distinguish between CP lengths. If the symbol separation is changed to some other fixed separation, then it should preferably be changed to another predefined (i.e., given in specification) value so that the communications device can more easily conduct a blind search.

Figure 8:
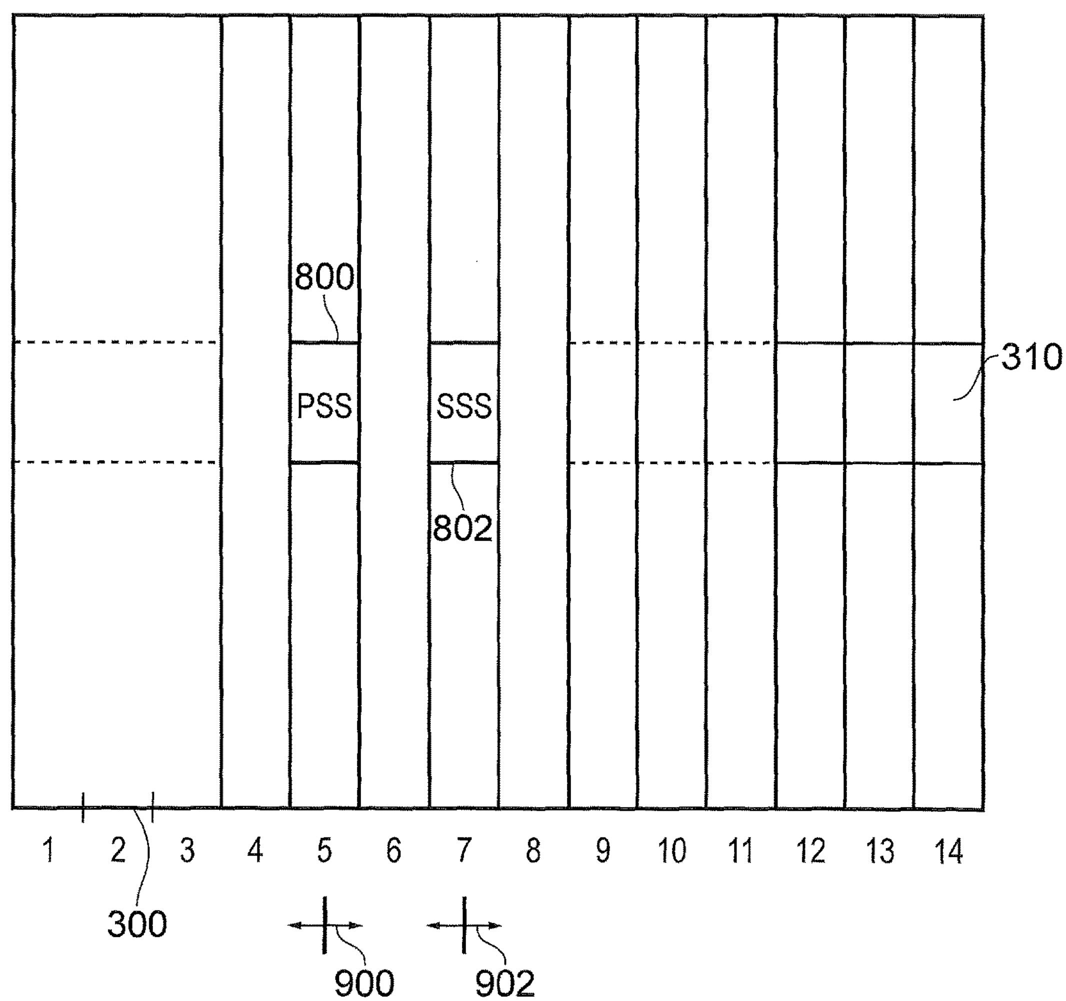
FIG. 8 provides a schematic diagram illustrating an example arrangement of synchronisation sequences of a wireless access interface within the OFDM symbols of a sub-frame in accordance with the present technique.

PCI Subset Restriction by Synchronisation Sequence Repetition OFDM Symbol Hopping FIG. 8 provides an example of a sub-frame which corresponds to the diagram shown in FIG. 3 but simplified in order to illustrate example embodiments of the present technique. In FIG. 8 a PSS 800 and SSS 802 are transmitted in resource blocks five and seven within the virtual carrier 310 which includes a central range of frequencies 310 within which the PSS/SSS are transmitted. Thus the OFDM symbol in which the PSS/SSS are transmitted can vary and the temporal location is then used to provide an indication of the PCI as explained above. As can be seen in FIG. 8 therefore the PSS/SSS may vary in the OFDM symbol in which it is transmitted and the variation as indicated by arrows 900, 902 may vary between cells. Thus, in this example, the third repetition of the PSS and/or SSS may vary in that the OFDM symbols in which at least one of the PSS and SSS is located may be different in different cells to indicate a PCI value or assist in the detection of the PCI value by a communications device. Jointly with the sub-frame n in which the third transmission of the PSS/SSS is discovered, the OFDM symbol(s) chosen provides further subsets which can be used to further reduce a range over which the communications device must search for a PCI of the cell, tending to further reduce $P_{MD}$. For example consider that the base station 101 is configured to transmit the third PSS/SSS repetition in sub-frame n=p. It could be specified that the PSS will still occur in OFDM symbol 6 (in FDD) but that the SSS may occur in any other suitable symbol s of sub-frame p, i.e. not those over which the control region extends (if a control region exists, which may not be the case on e.g. the NCT). The communications device is expected to search all such symbols to determine if a SSS (from among the restricted set indicated by n=p) has been transmitted in one of these symbols. This value s together with the value p in this example jointly indicate the set of confined PCI values which the cell PCI value forms part. The improvement in $P_{MD}$ would arise by allowing a possible misdetection of the value of SSS in symbol s to be corrected, i.e. the communications device correctly detects the presence of an SSS but has incorrectly identified which of the possible sequences the SSS is within the set of possible sequences. By further reducing the set of possible values, some of these misdetections can be eliminated, thereby reducing the probability of mis-detection $P_{MD}$.

In some embodiments further alterations to the sub-frame contents could be necessary if the moveable position of (for example) the SSS collides with reference signals (RS). Solutions include puncturing the SSS, or puncturing the RS. The former option could be better for backward compatibility, particularly since the advanced communications device would be aware of the SSS puncturing when testing a relevant OFDM symbol/sub-frame combination, whereas the latter option may preserve the performance of the SSS for the advanced communications device but could degrade the RS performance for legacy communications devices.

In another example the transmission of an SSS may not occur in any OFDM symbol at all in sub-frame p, and this absence can be used to create a further set of restricted values. In other examples, the third repetition of SSS can occur in any symbol of any sub-frame, i.e. not requiring that the additional repetitions of PSS and SSS be in the same sub-frame. The sub-frame and symbol in which it occurs may then jointly provide a restricted set indexes in the same manner as previously described. This would clearly have a much higher search load for the communications device, but this would be limited by noting that the SSS need only be searched over the restricted subset implied by the occurrence of PSS in sub-frame n=p (as noted above). Further restrictions on which sub-frame the SSS can occur in (and which the communications device is therefore expected to search) can be created by similar methods.

As will be appreciated, for the example of an unsynchronised NCT the implementation of this example embodiment may be simpler, because it is not necessary that three repetitions of PSS/SSS are transmitted.

As will be appreciated for the above example coherent detection of an SSS given a PSS may be possible depending on the coherence properties of the radio channel. Separating the PSS and SSS by more OFDM symbols may therefore affect the applicability of coherent detection. In the particular case of an MTC device, such as a smart utility meter, which may be stationary, the radio channel coherence can be expected to be long, so such devices may be tolerant of this effect.

In this embodiment, unlike the first, the OFDM symbol association between PSS and SSS is evidently changed. However, if as in the example, the PSS is transmitted in a fixed OFDM symbol, and this OFDM symbol is still different between TDD and FDD, and different between normal and extended CP then the communications device is able to distinguish.

Lower-Complexity OFDM Symbol Hopping

A computational load which must be performed by a controller in a communications device which is searching for the SSS in accordance with the present technique could be high because it would require the correlation of the received signal with all possible SSSs (although from a restricted set) in all possible OFDM symbols. Therefore in this example, the SSS may not be free to occur in any OFDM symbol and the communications device can therefore assume that it need not search some OFDM symbols. Some variations include:

- Fix instead the OFDM symbol in which the SSS must occur and apply the subset restriction on the basis of a moveable PSS. This is likely to deliver much smaller advantages on $P_{MD}$ reduction since there are only three possible PSSs.
- Specify or configure, e.g. via RRC, that if a (third repetition of) PSS occurs in OFDM symbol s then the SSS is only allowed to occur in a given subset of the OFDM symbols, rather than in any of them. A scenario where this could be useful is if a coverage-limited communications device is physically able to receive signals from multiple eNBs but the signals are very weak, and acquiring the cells is hard. Therefore, such a communications device could manage to acquire a first cell, and that eNB then RRC configures the communications device with the OFDM symbol restrictions applicable to each other cell, thus assisting the communications device's acquisition of those cells, allowing it to make RRM and interference measurements, prepare handover, etc. to those cells.
- Specify or configure that only certain differences in OFDM symbol number between PSS and SSS are permitted, i.e. that a communications device finding PSS occurring in symbol $s_P$ can assume that SSS occurring in symbol $s_S$ must obey some restrictions on $r=(s_P-s_s)$, such as:
  - A limit on the maximum value of $|r|$
  - That r may take only a restricted set of possible values.
  - $r>0$ or $r<0$ (note that $r>0$ would reverse the conventional order of PSS and SSS and could therefore have implications for the complexity of communications device implementation).

As will be appreciated mobile communications devices adapted in accordance with the present technique can be provided with a map of the relative position of the additional transmission of the PSS or SSS and the PCI group or groups which are indicated by the relative temporal position of the PSS and/or SSS. In one example this mapping is transmitted via the PBCH of the wireless access interface of the cell.

Multiple Additional Repetitions of PSS/SSS

In further examples, there can be any number of repetitions of synchronisation sequences within a radio frame. The joint set of sub-frames in which the synchronisation sequences are all detected can be used to create additional confined sets in accordance with the present technique. For example, consider that a third repetition of PSS/SSS occurs in sub-frame x and a fourth in sub-frame y. Then the joint index (x, y) replaces the index n in the examples above. This arrangement can be extended to further repetitions also such as a fifth repetition in sub-frame z creating a joint index (x, y, z). In either example, these additional confined subsets would allow each such subset to be smaller even than in the first embodiment hence further reducing $P_{MD}$.

To limit the communications device search requirements, restrictions on possible pairings (and, in general, sets) of sub-frames could be introduced. The kind of restrictions discussed for OFDM symbol pairings explained above could be used for this purpose.

Assisted GPS

In a conventional assisted GPS, the (general) cellular network provides information to the mobile device regarding, for example, which satellite orbits can be received given the time-of-day and the cell's location. This reduces the search load for the mobile device, and can significantly reduce the so-called 'time to first fix' Inasmuch as this is the network providing assistance to the communications device there is some similarity to this disclosure, but assisted GPS should not be considered prior art since the assistance information regarding a first signal is provided by a second signal rather than being implicitly conveyed by some inherent aspect of the first signal.

Example Mobile Communications System

Figure 9:
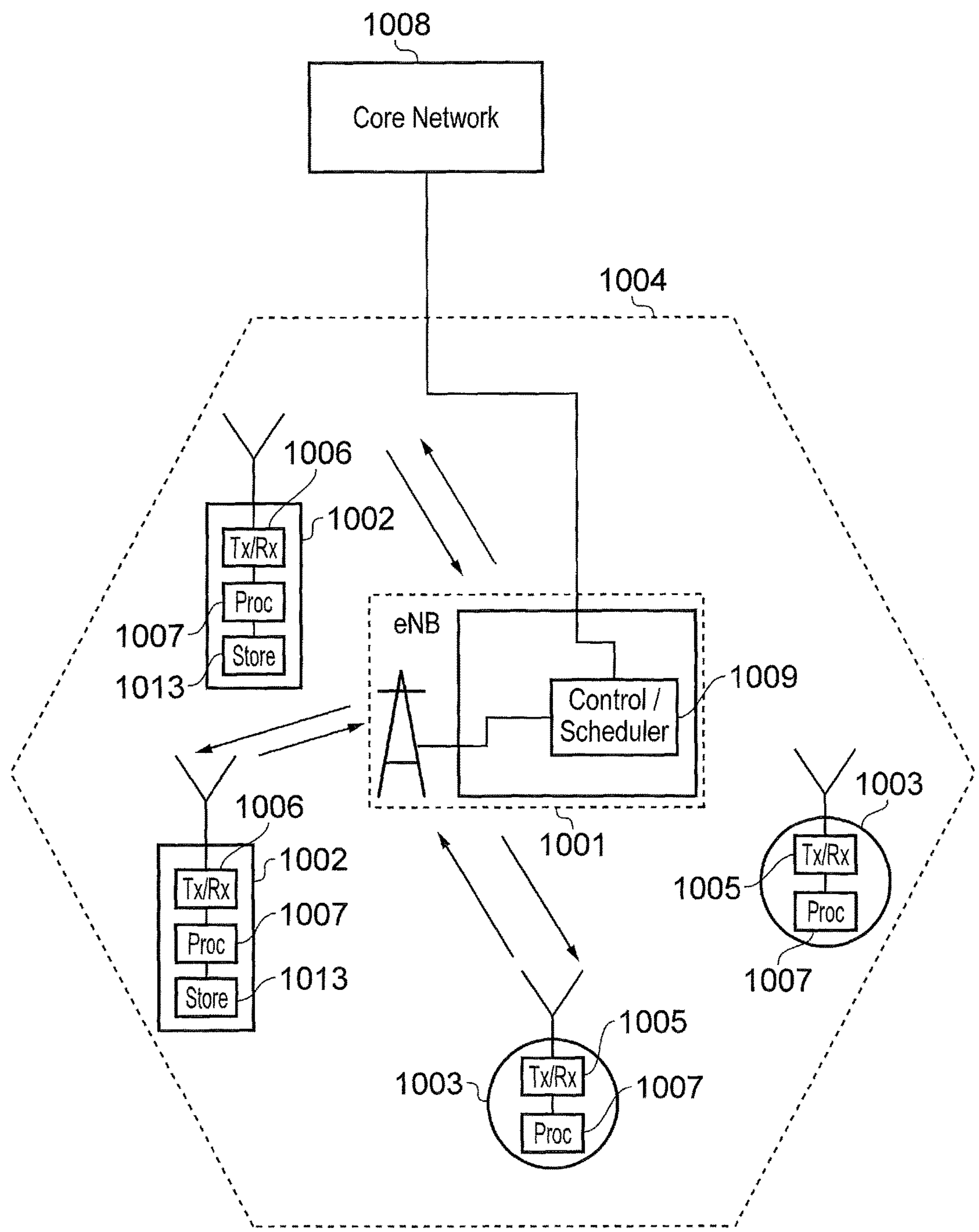
FIG. 9 is a schematic block diagram of a mobile communications system according to one example of the present technique.

FIG. 9 provides a schematic diagram showing part of an adapted LTE mobile communications system. The system includes an adapted enhanced Node B (eNB) 1001 connected to a core network 1008 which communicates data to a plurality of communications devices 1002 and a plurality of legacy communications devices 1003 within a coverage area (i.e. cell) 1004. Each of the legacy communications devices 1003 has a transceiver unit 1005 and a controller 1007 which is configured to detect a PSS and SSS transmitted in the sub-frames of a host carrier HC, which are the same sub-frames which are used to transmit the PSS and SSS in other cells of the mobile communications network. The adapted communications devices 1002 are configured to detect a synchronisation sequence PSS/SSS which varies in position within the frame from cell to cell as explained above. The temporal position within the frame of the PSS/SSS provides an indication of the cell identifier (PCI) which is also carried by the PSS/SSS. Therefore the adapted communications devices include a controller 1007 which estimates the PCI using a combination of the detected PSS/SSS and the indication of the PCI provided by the temporal location of the PSS/SSS transmitted within the frame. Optionally the base station 1001 transmits using a broadcast channel (PBCH) a relative mapping between the temporal location of the PSS/SSS and the PCI or the group of PCIs which the relative temporal position of the PSS/SSS indicates. However in other examples, the mapping between the PCI or group of PCIs and the temporal position of the PSS/SSS is pre-stored in a data store 1013 of the devices 1002.

The adapted eNodeB 1001 is arranged to transmit downlink data in accordance with a wireless access interface described above for example with reference to FIGS. 5 to 9. A transmitter and receiver unit 1009 forms the wireless access interface under the control of a controller 1011, which also performs the function of an adapted scheduler to schedule the transmission of the additional PSS/SSS or varying the position of the PSS/SSS within the frame to indicate the PCI for the cell.

Figure 10:
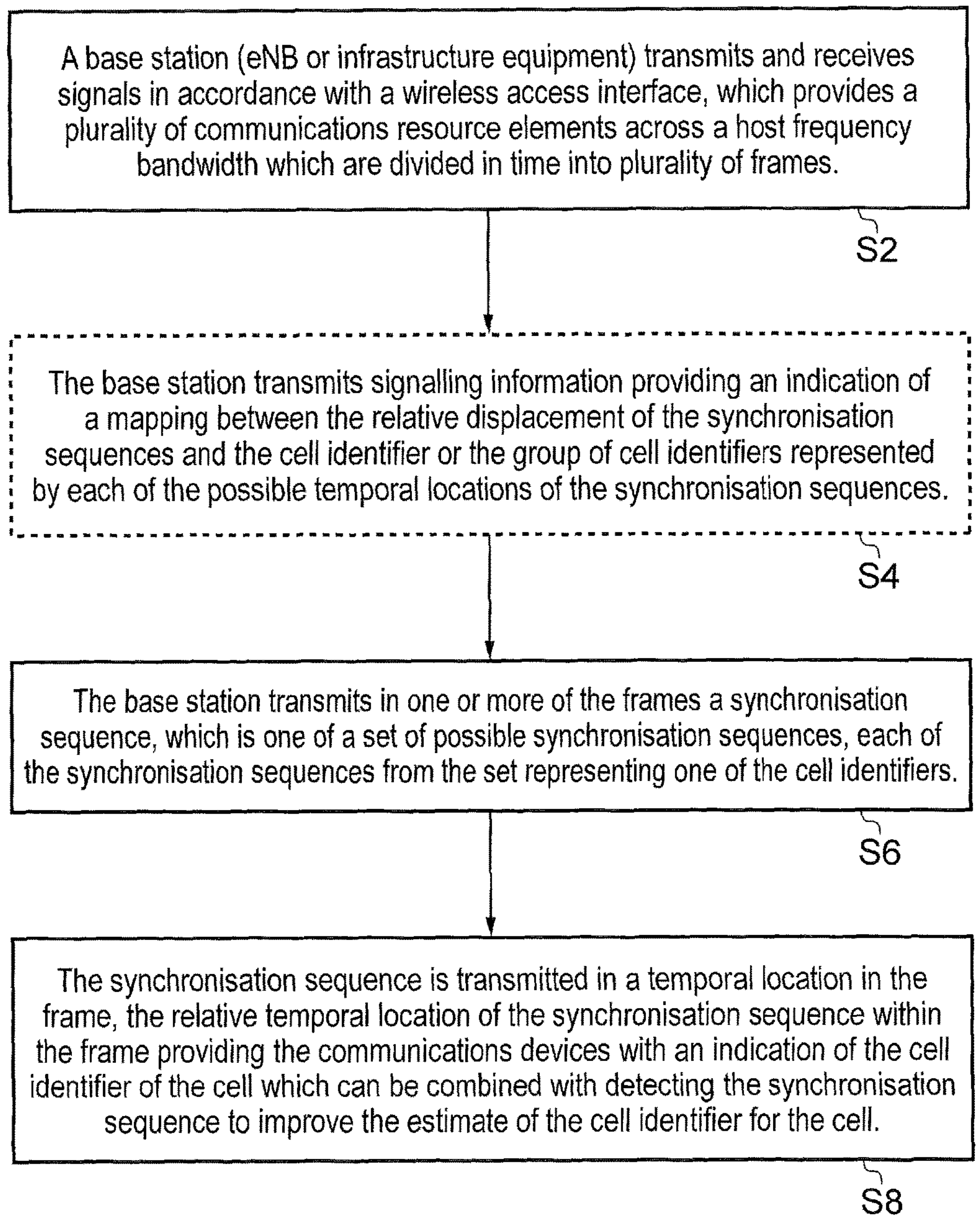
FIG. 10 is a flow diagram illustrating the operation of a base station in a mobile communications network according to the present technique.

The operation of a base station or eNB 501, 1001 according to the present technique is illustrated in one example by the flow diagram in FIG. 10, which is summarised as follows:

S2: As explained above with reference to FIG. 9 and the embodiments explained with reference to FIGS. 5 to 9, a base station, which may be for example an eNodeB or more generally an infrastructure equipment, which has been adapted in accordance with the present technique transmits and receives signals in accordance with a wireless access interface. The wireless access interface provides a plurality of communications resource elements across a host frequency bandwidth, which are divided in time to form a plurality of frames.

S4: Optionally, in one example, the communications devices are operable in accordance with a specification providing an indication of a mapping between the relative displacement of synchronisation sequences which are transmitted by the base stations and the cell identifier or the group of cell identifiers (PCI) which are represented by each of the possible temporal locations of the synchronisation sequences within a frame. As example, as indicated above the synchronisation sequence may comprise different parts each part being transmitted separately. For the example of an LTE communications system then the synchronisation sequence comprises a primary synchronisation sequence (PSS) and a secondary synchronisation sequence (SSS). Thus the communications devices are provided with an indication that the temporal position of a PSS/SSS can vary within the frame to provide an indication from their relative temporal position of the PCI for the cell. This can be for example an indication, depending on the temporal position, of a group of which the PCI forms a member.

S6: The base station which is adapted in accordance with the present technique transmits in one or more of the subframes of the wireless access interface synchronisation sequences (PSS/SSS) which are each from one of the sets of possible synchronisation sequences, each of which identifies one of the cell identifiers (PCI). As for the example of LTE, as explained above, the PSS provides an indication of one of three groups of PCIs and the SSS indicates the PCI within the group. Thus by allowing the position of the SSS to vary within the frame, only three different temporal locations are required to confirm that the PCI belongs to one of three groups. Thus even if there is an error in detecting the PSS, the relative temporal location of the SSS provides the communications device with an indication or confirmation of the group within of the PCI forms part.

S8: The synchronisation sequence (PSS/SSS) is transmitted in a temporal location in the frame which provides the communications devices within the indication of the PCI of the cell which can then be combined with the detected synchronisation sequence to improve the estimate of the cell identifier by the communications device.

Figure 11:
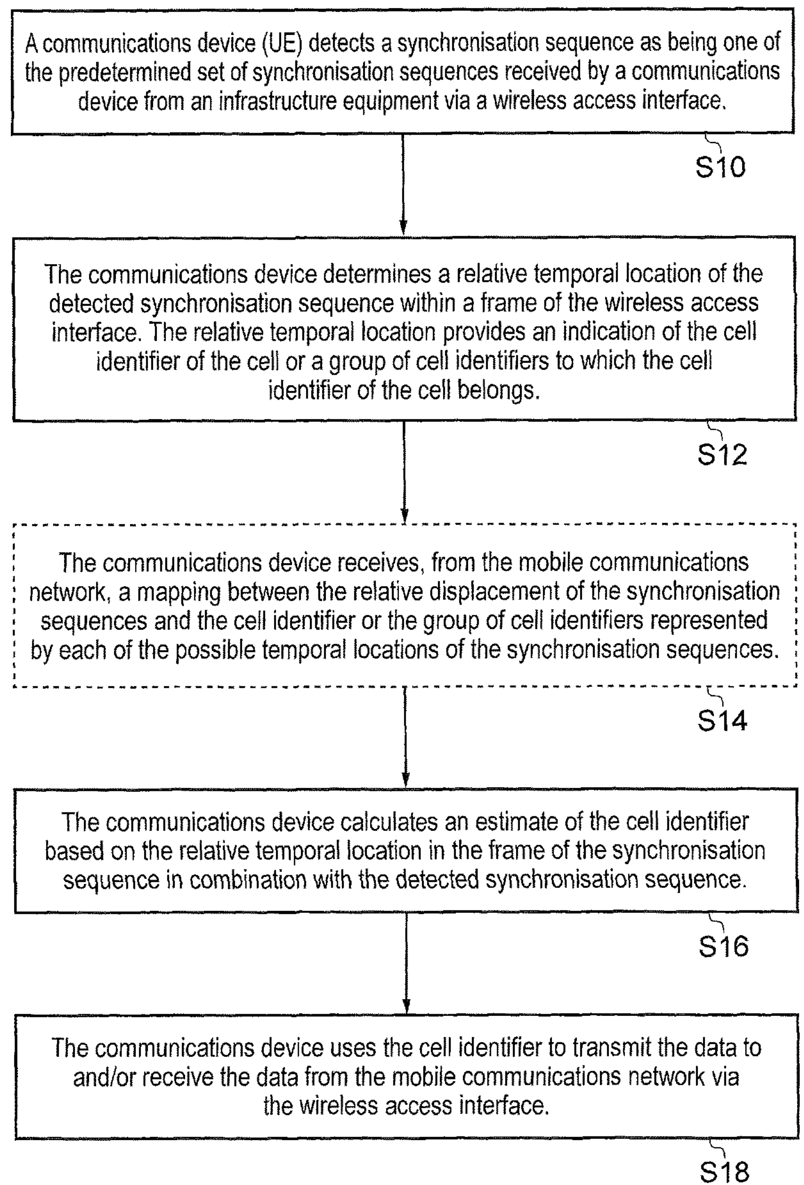
FIG. 11 is a flow diagram illustrating the operation of a communications device (UE) according to the present technique.

In respective of the operations performed by a communications device which is adapted in accordance with the present technique, FIG. 11 provides an illustrative representation of a process performed by the communications device in the form of a flow diagram. The flow diagram of FIG. 11 is summarised as follows:

S10: A communications device adapted in accordance with the present technique detects a synchronisation sequence as being one of a pre-determined set of synchronisation sequences transmitted by a base station (infrastructure equipment) which has been transmitted via a wireless access interface of the mobile communications network.

S12: The communications device determines a relative temporal location of the detected synchronisation sequence within a frame of the wireless access interface. The relative temporal location provides an indication of the cell identifier (PCI) of the cell or a group of cell identifiers (PCIs) to which the cell identifier of the cell belongs.

S14: Optionally in one example there is pre-stored in a memory of the communications device a mapping between the relative displacement of the synchronisation sequences within the frame and the cell identifier (PCI) or the group of cell identifiers (PCI's) represented by each of the possible temporal locations of the synchronisation sequences. In another example this mapping is received by the communications device from the mobile communications network.

S16: The communications device then calculates an estimate of the cell identifier (PCI) based for example on a combination of the relative temporal location in the frame of the synchronisation sequence and the value of the cell identifier carried by the detected synchronisation sequence itself. That is, the communications device is able to improve a probability of correctly detecting the PCI for the cell by combining or confirming the value of the PCI indicated by the relative temporal location of the synchronisation sequence or using the relative temporal location to identify a group of PCI values to which the PCI for the cell belongs. For example, where the synchronisation sequence is comprised of a PSS and an SSS, having detected the PCI group from the PSS, the communications device is able to confirm the PCI group from the relative temporal position of the SSS. Having detected the SSS, the communications device is able to identify the PCI within the confirmed group of PCI's.

S18: The communications device then uses the cell identifier (PCI) to transmit data to and receive data from the mobile communications network via the wireless access interface in accordance with a conventional arrangement. However as will be appreciated the communications device must detect the PCI in order to communicate data via the mobile communications network and in particular through the base station of the cell concerned. Thus improving the likelihood of correctly detecting the PCI value using the techniques explained above provides an advantage in reducing a likelihood of incorrectly detecting the PCI and therefore increases acquisition time.

Various further aspects and features of the present disclosure are defined in the appended claims Various combinations of the features of the dependent claims may be made with those of the independent claims other than the specific combinations recited for the claim dependency. Although embodiments of the present disclosure have been described with reference to LTE, it will be appreciated that other embodiments find application with other wireless communication systems such as UMTS.

Embodiments refer to PSS and SSS, but the methods described are not limited to the synchronisation sequences as currently specified in LTE and can be equally well applied to other synchronisation sequences. Such synchronisation sequences could be defined, for example, on the NCT or other new carriers specified in future, where the advantages of repetition can be further enhanced by adding techniques such as power boosting to the new synchronisation signals.

As discussed in the embodiments explained above, there could be some increase in the processing load at the communications device. However, a preferred implementation of such a communications device might only begin searching for the additional repetitions of synchronisation sequences according to the present technique once it determines that it is failing to achieve synchronisation using a conventional procedure. In this way, the processing load increment is only required when the advantage it would provide is clearly required. Also note that even in LTE Release 8 systems, there is a degree of blind decoding load at the communications device to acquire PSS/SSS since the communications device must already search over FDD or TDD frame structure, and normal or extended cyclic prefix as well as the five hundred and four PCIs. The mobile communications network need not transmit the additional repetitions of PSS/SSS in every radio frame—an advanced communications device would obtain benefit when it does, but the data capacity of a cell is higher when they are not transmitted. In a smart utility meter MTC case, the additional coverage provision of the invention might only be enabled at night, for example, when it could be arranged that such MTC devices will activate since non-MTC device populations may reduce at such times.

REFERENCES

[1] R1-072050
[2] R1-112469
[3] PCT/GB2012/050213
[4] PCT/GB2012/050214
[5] PCT/GB2012/050223
[6] PCT/GB2012/051326

The invention claimed is:

1. An infrastructure equipment for forming part of a mobile communications network, the infrastructure equipment comprising:

a transmitter configured to transmit signals to communications devices via a wireless access interface;

a receiver configured to receive signals transmitted from the communications devices via the wireless access interface; and a controller configured to control the transmitter and the receiver to form the wireless access interface providing a plurality of communications resource elements across a first frequency bandwidth, wherein the plurality of communications resource elements are divided in time into a plurality of frames and form one of a plurality of cells of the mobile communications network, each cell being allocated a physical layer identity (PCI) value by the mobile communications network, the controller is configured to control the transmitter to transmit, in one or more of the frames, a synchronisation sequence of a set of possible synchronisation sequences, each synchronisation sequence of the set of possible synchronisation sequences provides an indication of one PCI value of a corresponding cell, a temporal location of the synchronisation sequence within the frame provides the communications devices with an indication of cell identification information of the corresponding cell, and when the PCI value is not detected within the frame, the indication combined with the synchronisation sequence improves an estimate of the PCI value for the corresponding cell.

2. The infrastructure equipment as claimed in claim 1, wherein each of the frames is divided in time into a plurality of sub-frames, and the temporal location of the synchronisation sequence is the sub-frame in which the synchronisation sequence is transmitted.

3. The infrastructure equipment as claimed in claim 1, wherein the communications resource elements of the wireless access interface are formed from sub-carriers of Orthogonal Frequency Division Multiplexed (OFDM) symbols, and the temporal location of the synchronisation sequence is the OFDM symbol within one of the sub-frames in which the synchronisation sequence is transmitted.

4. The infrastructure equipment as claimed in claim 1, wherein the synchronisation sequence comprises a primary synchronisation sequence and a secondary synchronisation sequence, the secondary synchronisation sequence being one of a set of possible secondary synchronisation sequences, each secondary synchronisation sequence identifies one of a plurality of groups of PCI values and the primary synchronisation sequence identifying the PCI value within the group of PCI values, the controller controls the transmitter to transmit the primary synchronisation sequence and the secondary synchronisation sequence in each frame, and a second temporal location of at least one of the primary synchronisation sequence or the secondary synchronisation sequence within the frame provides the communications device with an indication of a group of possible PCI values that include the PCI value.

5. The infrastructure equipment as claimed in claim 4, wherein the controller is configured to control the transmitter to transmit, in each frame, a first primary synchronisation sequence in one of the sub-frames and a first secondary synchronisation sequence in one of the sub-frames, and transmit, in each frame, a second primary synchronisation sequence in another of the sub-frames and a second secondary synchronisation sequence in another of the sub-frames the time of transmission of the second primary synchronisation sequence or the second secondary synchronisation sequence provides the second temporal location indicating the group of PCI values including the PCI value, and the first primary synchronisation sequence and the first secondary synchronisation sequence are transmitted in the same sub-frames for each of the plurality of cells.

6. The infrastructure equipment as claimed in claim 5, wherein the wireless access interface includes a second carrier (NCT) providing communications resources for communications devices in addition to the first carrier, and the controller is configured to control the transmitter to transmit the first primary synchronisation sequence and the first secondary synchronisation sequence in the one of the sub-frames of the first carrier, and transmit the second primary synchronisation sequence and the second secondary synchronisation sequence, which are arranged to vary in the frame to represent the group of PCI values, on the second carrier of the cell.

7. The infrastructure equipment as claimed in claim 6, wherein the controller is configured to control the transmitter to transmit the second carrier, which is not synchronised to the first carrier, and transmit the first primary synchronisation sequence and the first secondary synchronisation sequence in the same one of the sub-frames in the second carrier as the first carrier and the same one of the sub-frames of the first carrier for other cells of the mobile communications network.

8. The infrastructure equipment as claimed in claim 1, wherein the controller is configured to control the transmitter to transmit an indication of a mapping between the temporal location of the synchronisation sequence for each cell and a group of PCI values or the PCI value of the cell.

9. A method of communicating with communications devices from an infrastructure equipment of a mobile communications network, the method comprising:

transmitting signals to communications devices via a wireless access interface;

receiving signals transmitted from the communications devices via the wireless access interface; and forming the wireless access interface to provide a plurality of communications resource elements across a first frequency bandwidth, wherein the plurality of communications resource elements are divided in time into a plurality of frames and form one of a plurality of cells of the mobile communications network, each cell being allocated a physical layer identity (PCI) value by the mobile communications network, the transmitting the signals includes transmitting, in one or more of the frames, a synchronisation sequence of a set of possible synchronisation sequences, each synchronisation sequence of the set of possible synchronisation sequences provides an indication of a PCI value of a corresponding cell, a temporal location of the synchronisation sequence within the frame provides the communications devices with an indication of cell identification information of the corresponding cell, and when the PCI value is not detected within the frame, the indication combined with the synchronisation sequence improves an estimate of the PCI value for the corresponding cell.

10. The method as claimed in claim 9, wherein each of the frames is divided in time into a plurality of sub-frames, and the temporal location of the synchronisation sequence is the sub-frame in which the synchronisation sequence is transmitted.

11. The method as claimed in claim 9, wherein the communications resource elements of the wireless access interface are formed from sub-carriers of Orthogonal Frequency Division Multiplexed (OFDM) symbols, and the transmitting in the frames the synchronisation sequence at the temporal location includes transmitting the synchronisation sequence using one of the OFDM symbols within one of the sub-frames.

12. The method as claimed in claim 9, wherein the synchronisation sequence comprises a primary synchronisation sequence and a secondary synchronisation sequence, the secondary synchronisation sequence being one of a set of possible secondary synchronisation sequences, each secondary synchronisation sequence identifies one of a plurality of groups of PCI values and the primary synchronisation sequence identifying the PCI value within the group of PCI values, the method further comprises transmitting the primary synchronisation sequence and the secondary synchronisation sequence in each frame, and a second temporal location of at least one of the primary synchronisation sequence or the secondary synchronisation sequence within the frame provides the communications device with an indication of the PCI value of the cell or a group of possible PCI values that include the PCI value.

13. The method as claimed in claim 12, wherein the transmitting the primary and secondary synchronisation sequences in each frame comprises transmitting, in each frame, a first primary synchronisation sequence in one of the sub-frames and a first of the secondary synchronisation sequence in one of the sub-frames, in the same sub-frames for each of the plurality of cells, and transmitting, in each frame, a second primary synchronisation sequence in another of the sub-frames and a second secondary synchronisation sequence in another of the sub-frames, and the transmitting of the second primary synchronisation sequence or the second secondary synchronisation sequence provides the second temporal indication representing the cell or the group of PCI values including the PCI value.

14. The method as claimed in claim 13, wherein the wireless access interface includes a second carrier (NCT) providing communications resources for communications devices in addition to the first carrier, and the method further comprises transmitting the first primary synchronisation sequence and the first secondary synchronisation sequence in the one of the sub-frames of the first carrier, and transmitting the second primary synchronisation sequence and the second secondary synchronisation sequence, which are arranged to vary in the frame to represent the group of PCI values, on the second carrier of the cell.

15. The method as claimed in claim 13, wherein the wireless access interface includes a second carrier (NCT) providing communications resources for communications devices in addition to the first carrier, and the method comprises transmitting the second carrier, which is not synchronised to the first carrier, transmitting the first primary synchronisation sequence and the first secondary synchronisation sequence in the one of the sub-frames of the second carrier, which is the same one of the sub-frames in the second carrier as the first carrier and the same one of the sub-frames of the first carrier for other cells of the mobile communications network, and transmitting the second primary synchronisation sequence and the second secondary synchronisation sequence, which are arranged to vary in the frame to represent the group of cell PCI values, on the second carrier of the cell.

16. The method as claimed in claim 9, further comprising transmitting an indication of a mapping between the temporal location of the synchronisation sequence for each cell and the group of PCI values.

17. A mobile communications network, comprising:

one or more infrastructure equipment configured to form, for each of a plurality of cells of the mobile communications network, a wireless access interface for transmitting signals to or receiving signals from communications devices, the wireless access interface providing for each of the cells a plurality of communications resource elements across a first frequency bandwidth which are divided in time into a plurality of frames, each cell being allocated a physical layer identity (PCI) value by the mobile communications network; and transmit, in one or more of the frames, a synchronisation sequence of a set of possible synchronisation sequences, wherein each synchronisation sequence of the set of possible synchronisation sequences provides an indication of one PCI value of a corresponding cell, a temporal location of the synchronisation sequence within the frame provides the communications devices with an indication of cell identification information of the corresponding cell, and when the PCI value is not detected within the frame, the indication combined with the synchronisation sequence improves an estimate of the PCI value for the corresponding cell.

18. The mobile communications network as claimed in claim 17, wherein each of the frames is divided in time into a plurality of sub-frames, and the temporal location of the synchronisation sequence is the sub-frame in which the synchronisation sequence is transmitted.

19. The mobile communications network as claimed in claim 17, wherein the communications resource elements of the wireless access interface are formed from sub-carriers of Orthogonal Frequency Division Multiplexed OFDM) symbols, and the temporal location of the synchronisation sequence is the OFDM symbol within one of the sub-frames in which the synchronisation sequence is transmitted.

20. The mobile communications network as claimed in claim 17, wherein the synchronisation sequence comprises a primary synchronisation sequence and a secondary synchronisation sequence, the primary synchronisation sequence being one of a set of possible primary synchronisation sequences, each primary synchronisation sequence identifies one of a plurality of groups of PCI values and the secondary synchronisation sequence identifying the PCI value within the group of PCI values, the one or more infrastructure equipment are configured to transmit the primary synchronisation sequence and the secondary synchronisation sequence in each frame, and a second temporal location of at least one of the primary synchronisation sequence or the secondary synchronisation sequence within the frame provides the communications devices with an indication of a group of possible PCI values that include the PCI value.

* * * * *